T. R. H. JOHNSON.
Apparatus for Making Beef Tea.

No. 147,645. Patented Feb. 17, 1874.

Witnesses.
Henry N. Miller
C. L. Evert.

Inventor.
Thomas R. H. Johnson
per Alexander Mason
Attorneys.

AM. PHOTO-LITHOGRAPHIC Co. N.Y. (OSBORNE'S PROCESS.)

UNITED STATES PATENT OFFICE.

THOMAS R. H. JOHNSON, OF WASHINGTON, PENNSYLVANIA.

IMPROVEMENT IN APPARATUS FOR MAKING BEEF-TEA.

Specification forming part of Letters Patent No. 147,645, dated February 17, 1874; application filed November 6, 1873.

*To all whom it may concern:*

Be it known that I, THOMAS R. H. JOHNSON, of Washington, in the county of Washington and in the State of Pennsylvania, have invented certain new and useful Improvements in Apparatus for Making Beef-Tea; and do hereby declare that the following is a full, clear, and exact description thereof, reference being had to the accompanying drawings, and to the letters of reference marked thereon, making a part of this specification.

The nature of my invention consists in the construction of an apparatus for making beef-tea, as will be hereinafter more fully set forth.

Figure 1:
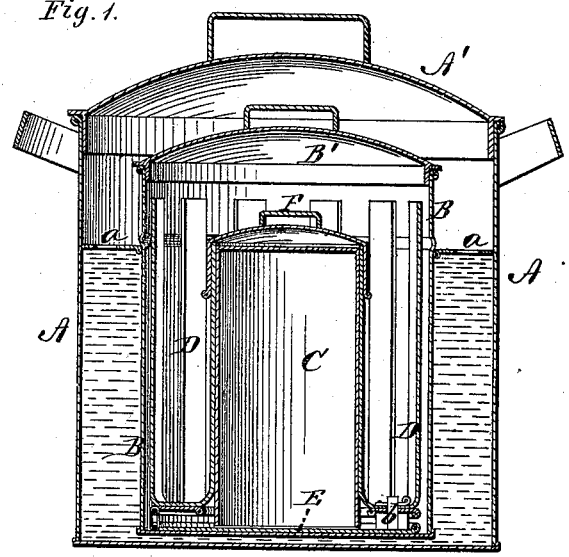
Figure 2:
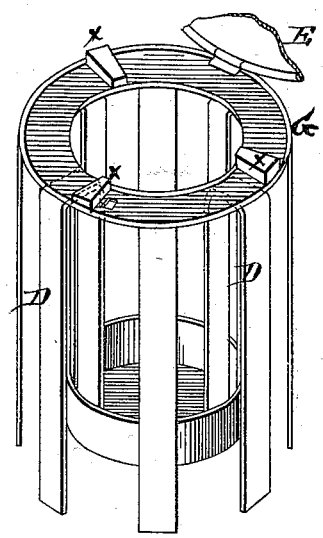
Figure 3:
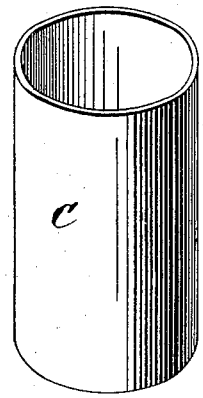

In the accompanying drawings, Figure 1 represents a section taken through the center of the entire apparatus. Fig. 2 represents a perspective view of the inner rack, bottom upward. Fig. 3 represents a perspective view of the interior open-ended cylinder.

In order to enable others skilled in the art to manufacture my invention, I will refer to accompanying drawings by letter.

A represents a water-tight vessel of suitable size and shape, and having a lid, A', and an inner circular perforated flange, $a$. B represents a similar vessel of smaller size, having a lid, B', and placed within the vessel A. D represents a rack formed of an inner and an outer series of vertical bars, connected at the bottom to a circular ring, G. This ring has under projections $x$ $x$, placed a suitable distance from each other, and a hinged lid, E, as shown in Fig. 2. C represents a cylinder, open at one end. This cylinder is placed, bottom upward, within the inner rows of the bars of the rack D, and rests with its open end upon the hinged bottom E. The inner rows of bars of the rack D are, at their upper end, provided with a stationary handle, F, in the form of a cap, inclosing the upper end of said bars. The bottom E of the rack is held in place by a suitable catch, $b$. In use the parts are placed together as shown in Fig. 1.

The operation of this apparatus is substantially as follows: The meat is placed in between the bars of the rack; water is placed in the vessel A around the vessel B, to fill the vessel A not higher than the flange $a$. Heat is applied to the outside vessel A, heating the water and generating steam, which passes through the perforations in the flange $a$. The heat and steam cause the juice to be extracted from the meat, which juice flows down and out between the spaces between the rim of the rack and the hinged bottom E. The air in the cylinder C becomes rarefied by the heat and escapes, and thus creates a partial vacuum in the cylinder. After the juice of the meat is sufficiently extracted, the lids A' and B' are taken off. The atmosphere coming in causes the extracted juice to flow in the cylinder C. The rack D and cylinder are then taken out and the two turned upside down, leaving the beef-tea in the cylinder.

Having thus fully described my invention, what I claim as new, and desire to secure by Letters Patent, is—

1. In an apparatus for making beef-tea, a rack, D, to hold the meat so that it may be acted upon on all sides by the heat, as herein set forth.

2. The combination of the rack B, false bottom E, cylinder C, and vessel B, substantially for the purposes herein set forth.

3. The combination of the boiler A, having an interior perforated flange, $a$, and the vessel B, all constructed substantially as and for the purposes herein set forth.

In testimony that I claim the foregoing I have hereunto set my hand this 27th day of September, 1873.

THOMAS R. H. JOHNSON.

Witnesses:
  HENRY M. DONGAN,
  JOHN H. MURDOCH.